United States Patent
Zinn et al.

(10) Patent No.: US 9,068,512 B2
(45) Date of Patent: Jun. 30, 2015

(54) METHOD FOR PROTECTING A GAS TURBINE ENGINE AGAINST HIGH DYNAMICAL PROCESS VALUES AND GAS TURBINE ENGINE FOR CONDUCTING THE METHOD

(75) Inventors: Hanspeter Zinn, Baden-Rütihof (CH); Ghislain Singla, Bern (CH); Bruno Schuermans, La Tour de Peilz (CH); Piotr Siewert, Nussbaumen (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 615 days.

(21) Appl. No.: 13/462,920

(22) Filed: May 3, 2012

(65) Prior Publication Data
US 2012/0279229 A1    Nov. 8, 2012

(30) Foreign Application Priority Data

May 5, 2011    (CH) ...................................... 0772/11

(51) Int. Cl.
*F02C 9/00*    (2006.01)
*F02C 9/26*    (2006.01)
(Continued)

(52) U.S. Cl.
CPC . *F02C 9/28* (2013.01); *F02C 7/057* (2013.01); *F02C 9/48* (2013.01); *F23N 5/16* (2013.01);
(Continued)

(58) Field of Classification Search
CPC ................. F23N 2041/20; F23N 5/003; F23R 2900/00013; F23R 2900/00014; F02C 9/28; F02C 9/00; F05D 2270/083; F05D 2270/301; F05D 2270/11; F05D 2260/96; F05D 2260/80
USPC ........... 60/773, 779, 793, 39.24; 431/19, 114; 700/287, 292, 290, 304; 701/99, 100; 702/182, 183, 75–78, 113–115
See application file for complete search history.

(56) References Cited

U.S. PATENT DOCUMENTS

| | | |
|---|---|---|
| 5,557,276 A | 9/1996 | Sakazawa et al. |
| 5,719,791 A | 2/1998 | Neumeier et al. |

(Continued)

FOREIGN PATENT DOCUMENTS

| | | |
|---|---|---|
| EP | 1229226 | 8/2002 |
| EP | 1 327 824 A1 | 7/2003 |

(Continued)

OTHER PUBLICATIONS

Search Report for Swiss Patent App. No. 00772/2011 (Jun. 16, 2011).
(Continued)

*Primary Examiner* — Phutthiwat Wongwian
*Assistant Examiner* — Steven Sutherland
(74) *Attorney, Agent, or Firm* — Buchanan Ingersoll & Rooney PC

(57) ABSTRACT

A method can protect a gas turbine engine (10), which includes a compressor (11), a combustor (13), and a turbine (12), against high dynamical process values, especially in combustor/flame pulsations. Effective protection against high dynamical process values, especially in combustor/flame pulsations, can be achieved by:
  a) measuring the pulsations of the combustor (13) with a suitable sensor (18),
  b) dividing the frequency spectrum of the measured pulsation signal up into pre-defined band pass sections,
  c) computing the rms (root mean square) of the signal for each band,
  d) weighting the computed frequency/frequency band rms with predetermined weighting factors,
  e) cumulating the weighted frequency/frequency band rms values to get a Pulsation Limit Criterion (PLC) value,
  f) comparing the PLC value with at least one reference value (23), and
  g) operating the gas turbine engine (10) according to the result of the comparison.

5 Claims, 1 Drawing Sheet

(51) Int. Cl.
*F02C 9/28* (2006.01)
*F02C 7/057* (2006.01)
*F02C 9/48* (2006.01)
*F23N 5/16* (2006.01)
*F23N 5/24* (2006.01)

(52) U.S. Cl.
CPC ....... *F23N 5/242* (2013.01); *F23R 2900/00013* (2013.01); *F05D 2260/80* (2013.01); *F05D 2260/96* (2013.01); *F05D 2270/11* (2013.01); *F05D 2270/14* (2013.01)

(56) References Cited

U.S. PATENT DOCUMENTS

| | | | |
|---|---|---|---|
| 6,464,489 | B1 * | 10/2002 | Gutmark et al. .................. 431/1 |
| 6,535,124 | B1 | 3/2003 | DiTommaso et al. |
| 6,721,631 | B2 * | 4/2004 | Shimizu et al. ............... 700/287 |
| 7,210,297 | B2 * | 5/2007 | Shah et al ...................... 60/772 |
| 7,337,057 | B2 | 2/2008 | Norman et al. |
| 7,451,601 | B2 * | 11/2008 | Taware et al. .................. 60/773 |
| 7,743,599 | B2 | 6/2010 | Taware et al. |
| 7,751,493 | B2 | 7/2010 | Niu et al. |
| 7,908,072 | B2 | 3/2011 | Tonno et al. |
| 8,260,523 | B2 | 9/2012 | Singh et al. |
| 8,560,205 | B2 | 10/2013 | Nomura et al. |
| 8,701,420 | B2 | 4/2014 | Nomura et al. |
| 2004/0011020 | A1 * | 1/2004 | Nomura et al. ............ 60/39.281 |
| 2004/0011051 | A1 | 1/2004 | Ryan et al. |
| 2006/0266045 | A1 * | 11/2006 | Bollhalder et al. ............. 60/725 |
| 2010/0076698 | A1 | 3/2010 | He et al. |
| 2010/0199680 | A1 * | 8/2010 | Nomura et al. .................. 60/773 |

FOREIGN PATENT DOCUMENTS

| | | |
|---|---|---|
| EP | 1 688 671 A1 | 8/2006 |
| EP | 1 995 519 A2 | 11/2008 |
| EP | 2239505 | 10/2010 |
| GB | 2 042 221 A | 9/1980 |
| GB | 2348484 | 10/2000 |
| JP | 4-186014 A | 7/1992 |
| JP | 7-107336 A | 4/1995 |
| JP | 8-223052 A | 8/1996 |
| JP | 11-324725 A | 11/1999 |
| JP | 2005-337254 A | 8/2005 |
| JP | 2006-070898 A | 3/2006 |
| JP | 2006-125976 A | 5/2006 |
| JP | 2006-183652 A | 7/2006 |
| JP | 2009-008077 A | 1/2009 |
| JP | 2009-203943 A | 9/2009 |
| JP | 2010-261434 A | 11/2010 |

OTHER PUBLICATIONS

Brochure for Meggitt & Vibro-Meter SA, "New Dynamic Pressure Sensors", 2010.

Notification of Reasons for Refusal (OA) issued Jan. 13, 2015 by the Japanese Patent Office in Japanese Patent Application No. 2012-105501, and an English translation thereof.

* cited by examiner

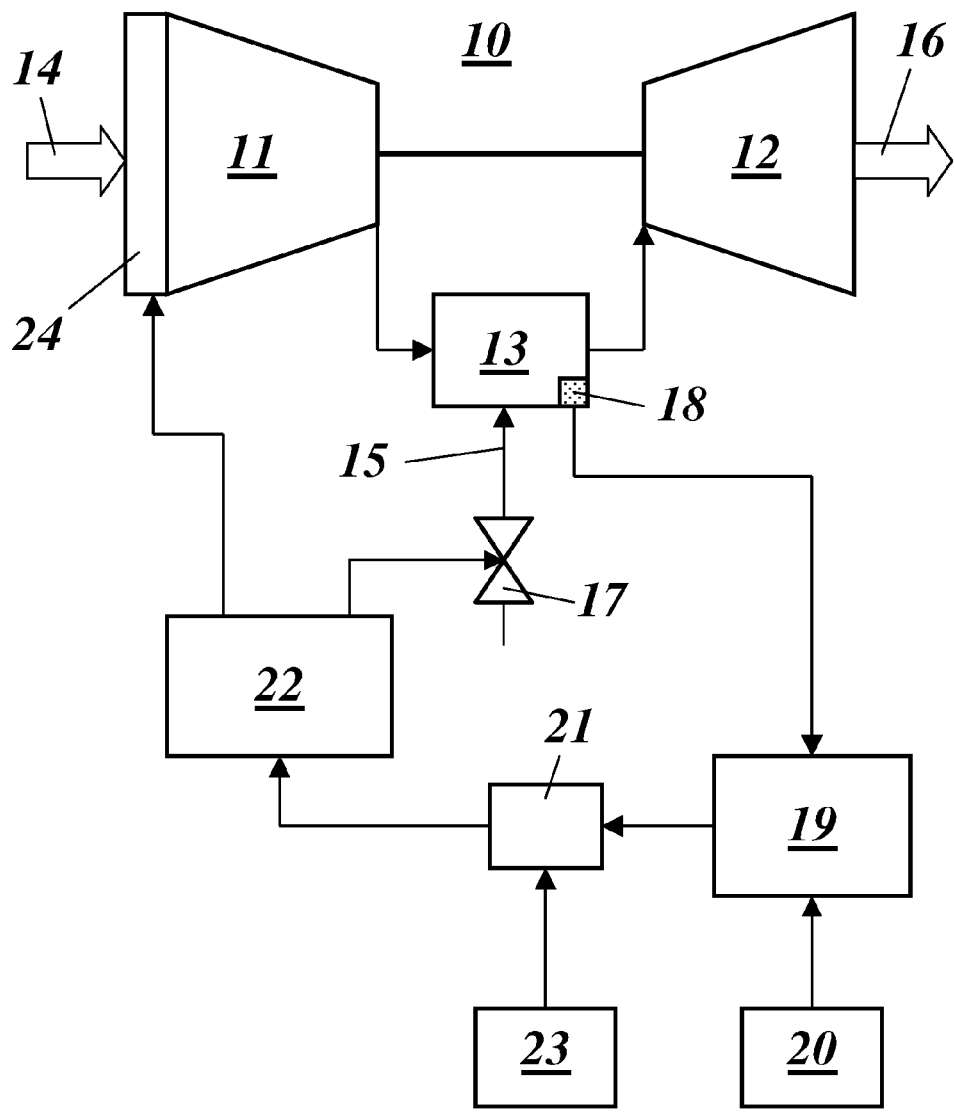

METHOD FOR PROTECTING A GAS TURBINE ENGINE AGAINST HIGH DYNAMICAL PROCESS VALUES AND GAS TURBINE ENGINE FOR CONDUCTING THE METHOD

This application claims priority under 35 U.S.C. §119 to Swiss App. No. 00772/11, filed 5 May 2011, the entirety of which is incorporated by reference herein.

BACKGROUND

1. Field of Endeavor

The present invention relates to gas turbine engines, and more specifically to a method for protecting a gas turbine engine, including a compressor, a combustor and a turbine, against high dynamical process values.

It also relates to a gas turbine engine useful for conducting such a method.

2. Brief Description of the Related Art

Pulsation measurement equipment is an integral part of a gas turbine protection system. The purpose of the equipment is to supervise combustion phenomena like pulsation (screeching, rumbling, humming, etc.) to cause an immediate engine shut down or to initiate a change in the engine operation point in the event of sudden high pulsations or long lasting moderate pulsation levels in order to protect the engine from severe damage.

Pulsation monitoring on gas turbines is required because the combustion is operated close to the lean extinction limit to reduce emissions. The combustion flame instabilities are interacting with the flow and generate powerful acoustic waves. These waves excite the thermally highly loaded structures of the combustor. If the mechanical vibrations of combustor hot gas parts match in some ways with the acoustic pulsation load, significant wear, leading to a lifetime reduction or even immediate failure, occurs.

The pulsations in a gas turbine combustor are usually measured directly inside the combustor in order to have an accurate measurement across the full frequency spectrum of the pulsations. The conversion of the physical hot gas pressure fluctuation into an electric output signal (high frequency, voltage or current or digital) is performed by a high temperature dynamic sensor (microphone, dynamic pressure transducer, dynamic pressure pick-up, piezo-electric, piezo-resistive, capacitor, strain gage, optical or any other principle), which is combined with suitable signal conditioning (the specific working principle of the sensor is not relevant to the invention disclosed below).

However, the direct strain or acceleration measurement on a single component is not considered here. This kind of approach is limited to the structure being measured and the signal cannot be used to infer the stresses in other components not measured. The acoustic signal represents the direct excitation function to the complete structure.

The conditioned sensor signal is subsequently processed, cut into one or more supervision frequency bands, which are individually analyzed and evaluated by a suitable algorithm in the gas turbine protection logic. The filtering of the signal is usually done by analog filters. Their filtering characteristics allow for a certain crosstalk between neighboring bands. A better filtering procedure is described in document EP 1 688 671 A1 or U.S. Pat. No. 7,751,943, where the band pass information is extracted in the frequency domain. The amplitudes of these filtered bands are then used as a measure to change the engine operation point (e.g., de-rating the power output) or to shut down the engine immediately or use it as a feedback control parameter in active combustor controls (ACC) systems for performance optimization and instability control.

The pulsation of an engine is not fully predictable and depends on various parameters: fuel quality, fuel/air ratio, combustion operation modes, fuel systems failures, wear of seals, compressor mass flow changes, hydrodynamic time lags, etc. The weakness of the currently used engine protection method is that the parameters for the decision thresholds (pulsation severity, time delay, frequency bands) for initiating a certain engine protective action (alarm, operation point adjustment, trip, etc.) is up to now always based on weak empirical evidence using damage profiles of inspected hardware. This limits the confidence to older engine designs, which have experienced several inspection cycles and prevent the definition of any protection for new Gas Turbine Systems for which no field experience is available.

The combustion settings of newly installed or serviced engines are usually optimized for power, efficiency and lifetime using the spectral information of the dynamic pulsation signal. During this procedure, the combustion parameters are usually tuned in such a way as to reduce the highest peak of the dominant acoustic mode. This may be misleading for the following reasons:

a) it is currently not possible to define a maximal allowed pulsation level of a certain peak or frequency band for continuous engine operation using only wear marks of hot gas components. The empirical approach provides no answers between the coupling of the acoustics excitation and the structural failure modes;

b) the highest peak may not be the only one responsible for the structural resonances, while some lower pulsation peaks might be exciting the structure directly.

These engine adjustments are also needed when engine components receive an upgrade (e.g., compressor blading upgrade). The pulsation spectrum may then be different and the empirical basis for an optimal engine adjustment and protection needs to be re-established, which may take several years of feedback.

The current state of the art in pulsation monitoring of heavy-duty gas turbines is well described by the reference "Technical Progress Report; Castaldini, C., CMC-Engineering; Guidelines for Combustor Dynamic Pressure Monitoring, EPRI, Palo Alto, Calif., 2004, Product ID: 1005036". Pulsation monitoring is now a standard tool to adjust a heavy-duty gas turbine, to protect the engine from immediate dangerous pulsation peaks (see for example documents EP 1 688 671 A1 or U.S. Pat. No. 5,719,791), as well as use for automated feedback (see document GB 2 042 221 A) for emission control and active damping or just to monitor the combustor acoustics by recording the trends in order to meet the combustor lifetime specifications. The main focus in the development of pulsation monitoring in the past was mainly directed towards the sensor side to reach higher operating temperatures (see, for example, product leaflet "New dynamic pressure sensors" of MEGGITT, 2010) and signal interfaces (EP 1 688 671 A1).

While there are some documents that describe active control of pulsations by use of a feedback loop (e.g. EP 1 327 824 A1) there are only few patents that describe the use of the signal for engine protection actions (EP 1 688 671 A1). The protection settings are usually defined by using empirical evidence of known damages (see Technical Progress Report; Castaldini, C., CMC-Engineering; Guidelines for Combustor Dynamic Pressure Monitoring, EPRI, Palo Alto, Calif., 2004, Product ID: 1005036).

There is one document, however, which describes a method to estimate the lifetime of the combustor based on the acoustic signal (EP 1 995 519 A2). The method according to that document uses the frequency and amplitude of the acoustic oscillations as a direct cyclic load input to assess the cumulative damage of the material used in the combustor (fatigue). A cumulative damage value is computed which, when reaching a specific value, is used to initiate a command to switch off the turbine to initiate an inspection. This approach assumes that the acoustic modes are exciting the combustor structure directly at that frequency and that the material stress is directly a function of the amplitude of the acoustic frequency, which is misleading.

The disadvantages of that known method are as follows:

This approach does not take structural resonances into account. It takes every frequency as an equal contributor to the cumulative damage of the material according to its amplitude. Structural resonances can amplify the stresses in a structure many times over a normal vibration level. Some frequencies may not be dangerous at all since no structural resonance is excited.

The method does not provide any information about the best adjustment of the engine parameters for optimal lifetime. It is passive and just checks the accumulated cycles. Due to the fact that many engine parameters have an effect on the combustor pulsations, the operation point of a gas turbine can be set to provide the best lifetime of the hot gas parts.

The method can lead to early and unnecessary engine shutdowns because the accumulated damage coefficient is based on all frequencies of the pulsations. The engine availability can therefore be affected.

The state of the art in monitoring and controlling combustor pulsations is as follows:

Pulsation signals are recorded with a suitable high temperature sensor at the combustor and analyzed by analog or digital (FFT) band pass filtering (e.g., U.S. Pat. No. 7,751,493 B2).

Representative frequency bands are extracted or specific frequency peaks are tracked. The rms values of the bands (U.S. Pat. No. 7,751,493 B2) or the amplitudes of the principal peaks are used as a measure for the severity of the pulsations.

The rms value or peak amplitude is compared against a threshold value which, when exceeded, initiates a protective measure on the gas turbine after a specific delay time (U.S. Pat. No. 7,751,493 B2) or provides a control signal to move the operation point of the engine (e.g., load change). Simpler concepts just consider regular checks of the frequency spectrum for shifts of the dominant peaks.

The threshold value is usually defined based on engine failure diagnostics feedback (wear analysis, damage pattern analysis, see Technical Progress Report; Castaldini, C., CMC-Engineering; Guidelines for Combustor Dynamic Pressure Monitoring, EPRI, Palo Alto, Calif., 2004, Product ID: 1005036). There is no specific description in the literature or in patent documents of a direct method that defines the correlation between acoustic amplitudes and frequencies with regard to hot gas parts failures. The only reference found, described in document EP 1 995 519 A2, tries in a simplified way to predict the lifetime of the combustor material. It fails to provide a link between the driving acoustic modes and the resulting hardware vibrational modes and material stresses.

Engine adjustments are done based on pulsation frequency spectra, where the largest peak is usually reduced by adjusting the principal combustion parameters. With the available knowledge, there is no possibility to have a definite rule which pulsation peaks affect most the component lifetime.

Structural models for mechanical integrity and lifetime assessments of structures or even complete gas turbines are state of the art and part of the engine development and design process.

There is currently no method available that links the measured acoustic pulsation data with the achievable lifetime of the combustor structure. Engine adjustments are performed with the target to reduce the principal pulsation peaks, which is not the optimal approach. The conservative settings do not allow utilizing the full engine potential (power, efficiency) and may be even misleading in the lifetime prediction, since not the most damaging frequencies are reduced.

SUMMARY

One of numerous aspects of the present invention includes a method for protecting a gas turbine against high dynamical process values, especially in combustor/flame pulsations, which can avoid disadvantages of the known methods and provides a link between engine pulsations and structural lifetime, is simple to use in the field, and informative to the operator of the engine.

Another aspect includes a system useful for conducting the method.

Another aspect includes a method for protecting a gas turbine engine, the gas turbine comprising a compressor, a combustor, and a turbine, against high dynamical process values, especially in combustor/flame pulsations. The method comprises the steps of measuring the pulsations of the combustor with a suitable sensor, dividing the frequency spectrum of the measured pulsation signal up into pre-defined band pass sections, computing the rms (root mean square) of the signal for each band, weighting the computed frequency/frequency band rms with predetermined weighting factors, cumulating the weighted frequency/frequency band rms values to get a Pulsation Limit Criterion (PLC) value, comparing the PLC value with at least one reference value, and operating the gas turbine engine according to the result of said comparison.

According to an embodiment, said weighting factors are predetermined by using a structural model for the complete structure of the combustor and other affected components, and by computing the stresses as a response to the acoustic load resulting from pulsations in the combustor.

Another embodiment is characterized in that the Hot Gas Parts of the combustor structure are forced with a broadband frequency signal, thereby exciting multiple structural eigenmodes simultaneously, that the resulting structural stresses as function of the Hot Gas Part eigenmodes, pulsation load amplitude, and pulsation load frequency/frequency band for the frequency bandwidth are input to a lifetime model, that the achievable lifetime of the components is predicted over the frequency bandwidth of interest, and that the sensitivity of the Hot Gas Parts to the frequency/frequency band is captured by weighting the frequency/frequency band as the result of the frequency/frequency band forcing calculation with said weighting factors.

According to another embodiment, a recommended maximal PLC value for the operation, $PLC_{operation}$, is defined, and the gas turbine engine is operated such that $PLC \leq PLC_{operation}$.

According to just another embodiment the $PLC_{operation}$ value is in the range of 0.6 . . . 0.9.

A gas turbine engine useful for conducting methods embodying principles of the present invention comprises a compressor, a combustor, a turbine and a gas turbine control. It is characterized in that at least one sensor is provided to sense pulsations within the combustor, said at least one sensor is connected to a signal processing unit, which derives from the pulsation signal of the at least one sensor a Pulsation Limit Criterion(PLC) value by a lifetime model of the combustor, a comparing means is provided, which receives said derived Pulsation Limit Criterion(PLC) value from said signal processing unit and compares it to a reference value, and an output of said comparing means is connected to an input of said gas turbine control.

BRIEF DESCRIPTION OF THE DRAWING

The present invention is now to be explained more closely by means of different embodiments and with reference to the attached drawings, in which the single drawing figure shows a gas turbine engine according to an embodiment of the invention.

DETAILED DESCRIPTION OF EXEMPLARY EMBODIMENTS

Methods embodying principles of the present invention are based on a global, component lifetime focused approach to pulsation supervision, control and engine adjustment.

Systems and method embodying principles of the present invention enable the adjustment of the combustor operation point with regard to optimal lifetime of the combustor parts as well as allowing operating a gas turbine permanently within its safe limits. In the optimal case, exemplary methods provide additional margins to adjust the engine for higher power and efficiency while ensuring full lifetime of the components. The methods are applicable to all types of engines with a continuous combustion process, mainly stationary and mobile gas turbines but also to boiler furnaces that have acoustic modes that excite the structures. The methods allow also for innovative engine operation modes, like maximizing the power output with correspondingly shortened maintenance cycles. The methods could be extended to the optimization of other engine parameters, like emissions, that are correlated with the combustion acoustic modes.

An element of an exemplary method is a lifetime model as function of the acoustic forcing:

a) A structural model for the complete combustor structure and other affected components is used to compute the stresses as a response to the acoustic load resulting from pulsations. The specific method or model or 3-dimensional Finite Element Model is not relevant, but attention must be paid to utilize an acoustic load as close as possible as a real pulsation signal. A real pulsation signal is made of multiple acoustic frequencies exciting multiple structural eigenmodes simultaneously. The Hot Gas Parts must then be forced with a broadband frequency signal. The resulting output are the structural stresses as functions of the Hot Gas Part eigenmodes, pulsation load amplitude and pulsation load frequency/frequency band for the frequency bandwidth considered and specified lifetime.

b) The component stresses are input to the lifetime model. For the frequency/frequency band, the achievable lifetime of the components is predicted over the frequency bandwidth of interest.

c) The sensitivity of the Hot Gas Parts to the frequency/frequency band is captured by weighting the frequency/frequency band as the result of the frequency/frequency band forcing calculation (cf. a)).

For efficiency of the method, it is advantageous to use a limited number of band pass ranges (rms) as a representation of the acoustic forcing. The number of band pass ranges defines also the number of weighting factors. In principle this method could also be applied to individual bins of the spectrally decomposed signal.

Another element of exemplary methods is the signal processing:

d) The pulsations of the combustor are measured with a suitable sensor. Its signal is processed per time step as follows (the filtering may be according to document EP 1 688 671 A1):

(1) The time dependent signal is converted into the frequency domain (FFT or similar).

(2) The spectrum is divided up into pre-defined band pass sections and the rms (root mean square) of the signal is computed for that band. The band pass sections must not overlap or have gaps. The method could also be implemented by filtering done in the time domain. This would require very sharp filters and the unavoidable gaps and crosstalk between bands would introduce errors. Fast real time processing systems are state of the art and signal filtering is best done according the method shown in document EP 1 688 671 A1.

(3) The sensitivity of the Hot Gas Parts to each frequency/frequency band is captured by weighting the frequency/frequency band rms value. As mentioned in section c), above, the weights, calculated for the set of frequencies/frequency bands, result from section a).

(4) If the cumulated weighted frequency/frequency band rms values, called PLC, exceeds 1, then the combustor mechanical integrity over the required lifetime will not be reached.

(5) The following PLC values can occur:

PLC=1 The engine is (theoretically) reaching exactly the planned lifetime (inspection interval)

$PLC \leq PLC_{operation}$ (where $PLC_{operation}$ is the recommended maximal value for the operation. It includes a safety factor for covering the uncertainties in the real engine and the uncertainties in the model (typical values of PLC are expected to be in the range of 0.6-0.9 of $PLC_{operation}$). The engine is operating in a safe operation point and will reliably reach the predicted lifetime.

$PLC \geq 1$ The engine is operated outside the allowed operation point. If operated continuously at this level, it will not reach the planned lifetime.

An embodiment of a gas turbine engine embodying principles of the present invention is shown in FIG. 1. The gas turbine engine 10 of FIG. 1 includes a compressor 11, a turbine 12 and a combustor 13. The compressor 11 compresses air, which is sucked in to an air inlet 14 through variable inlet vanes 24. The compressed air is used to burn a fuel in the combustor 13. The fuel is supplied by the fuel supply 15 through a valve 17. Hot gas exits the combustor 13 and enters the turbine 12. Exhaust gas exits the turbine 12 at an exhaust gas outlet 16. At least one sensor 18 is arranged in the combustor 13 to sense pulsations within the combustor 13. The sensor 18 is connected to a signal processing unit 19 which processes the pulsation signal in accordance with the results of a lifetime model 20 for the combustor structure. The signal processing unit 19 sends a Pulsation Limit Criterion (PLC) value to a comparing device 21, where it is compared to a reference value 23. The result of the comparison is used as a control parameter in the gas turbine control 22.

The engine adjustments and control are done as follows:

e) During commissioning (for a newly installed engine or one having undergone a maintenance inspection), the combustion parameters (e.g., the position of the variable input vanes 24 or the fuel supply via valve 17) are adjusted to achieve the desired engine power and efficiency targets while considering the PLC value. The PLC value should be ≤$PLC_{operation}$.

f) During operation, the engine is operated at values ≤$PLC_{operation}$. This can be checked by a trend analysis (e.g., by PPSView described in document EP 1 688 671 A1) or the PLC value is considered in the control algorithm.

g) Special operation situations: Engine operators may wish to extend the service interval or to generate more power. In both cases, the PLC value can be updated by loading new weighting factors that are based on the new maintenance cycle.

List of Reference Numerals
10 gas turbine engine
11 compressor
12 turbine
13 combustor
14 air inlet
15 fuel supply
16 exhaust gas outlet
17 valve
18 sensor
19 signal processing unit
20 lifetime model
21 comparing means
22 gas turbine control
23 reference value ($PLC_{operation}$)
24 variable inlet vane (VIV)

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for protecting a gas turbine engine, the gas turbine having a compressor, a combustor, and a turbine, against high dynamical process values, including combustor/flame pulsations, the method comprising:
a) measuring pulsations of the combustor with a sensor;
b) dividing the frequency spectrum of the measured pulsation signal up into pre-defined band pass sections;
c) computing the root mean square (rms) of the signal for each band;
d) weighting the computed frequency/frequency band rms with predetermined weighting factors;
e) cumulating the weighted frequency/frequency band rms values to get a Pulsation Limit Criterion (PLC) value;
f) comparing the PLC value with at least one reference value; and
g) operating the gas turbine engine according to the result of said comparing,
wherein said weighting factors are predetermined based on a structural model for a complete structure of the combustor and other affected components, and by computing the stresses as a response to the acoustic load resulting from pulsations in the combustor.

2. The method according to claim 1, further comprising:
forcing Hot Gas Parts of the combustor structure with a broadband frequency signal, thereby simultaneously exciting multiple structural eigenmodes;
inputting structural stresses from said forcing as a function of the Hot Gas Part eigenmodes, pulsation load amplitude, and pulsation load frequency/frequency band for a frequency bandwidth to a lifetime model;
predicting achievable lifetime of the components over the frequency bandwidth of interest; and
capturing a sensitivity of the Hot Gas Parts to the frequency/frequency band by weighting the frequency/frequency band as the result of the frequency/frequency band forcing calculation with said weighting factors.

3. A method according to claim 1, further comprising:
defining a recommended maximal PLC value for the operation, $PLC_{operation}$; and
operating the gas turbine engine such that PLC≤$PLC_{operation}$.

4. A method according to claim 3, wherein the PLC value is in the range of 0.6-0.9 of the $PLC_{operation}$.

5. A gas turbine engine comprising:
a compressor;
a combustor;
a turbine;
a gas turbine control unit having an input;
a signal processing unit;
at least one sensor configured and arranged to measure pulsations within the combustor and generate a pulsation signal, said at least one sensor being connected to the signal processing unit;
wherein the signal processing unit is configured and arranged to divide the frequency spectrum of the measured pulsation signal up into pre-defined band pass sections;
compute the root mean square (rms) of the signal for each band;
weight the computed frequency/frequency band rms with predetermined weighting factors;
cumulate the weighted frequency/frequency band rms values to derive a Pulsation Limit Criterion (PLC) value,
wherein said weighting factors are predetermined based on a structural model for a complete structure of the combustor and other affected components, and by computing the stresses as a response to the acoustic load resulting from pulsations in the combustor; and
a comparing device configured and arranged to receive said derived Pulsation Limit Criterion (PLC) value from said signal processing unit and compare the PLC value to a reference value and generate an output, and the output of the comparing device is connected to the input of the gas turbine control.

* * * * *